US012616967B2

(12) United States Patent \
Born et al.

(10) Patent No.: US 12,616,967 B2 \
(45) Date of Patent: May 5, 2026

(54) PRECIOUS METAL MESH FOR CATALYZING GAS-PHASE REACTIONS

(71) Applicant: UMICORE AG & CO. KG, Hanau-Wolfgang (DE)

(72) Inventors: Dirk Born, Langenselbold (DE); Dieter Prasch, Steinau (DE); Artur Wiser, Frankfurt (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 309 days.

(21) Appl. No.: 18/252,321

(22) PCT Filed: Nov. 16, 2021

(86) PCT No.: PCT/EP2021/081805 \
§ 371 (c)(1), \
(2) Date: May 9, 2023

(87) PCT Pub. No.: WO2022/106395 \
PCT Pub. Date: May 27, 2022

(65) Prior Publication Data \
US 2023/0398531 A1      Dec. 14, 2023

(30) Foreign Application Priority Data

Nov. 17, 2020    (EP) .................................... 20000416

(51) Int. Cl. \
*B01J 35/06*      (2006.01) \
*B01J 23/42*      (2006.01) \
*B01J 23/44*      (2006.01) \
*B01J 35/02*      (2006.01) \
*B01J 35/58*      (2024.01) \
*C01B 21/26*      (2006.01)

(52) U.S. Cl. \
CPC ............... *B01J 35/58* (2024.01); *B01J 23/42* (2013.01); *B01J 23/44* (2013.01); *C01B 21/265* (2013.01)

(58) Field of Classification Search \
None \
See application file for complete search history.

(56) References Cited

U.S. PATENT DOCUMENTS

| | | | |
|---|---|---|---|
| 5,232,891 | A | 8/1993 | Hörmann et al. |
| 6,089,051 | A | 7/2000 | Gorywoda et al. |
| 2002/0127932 | A1 | 9/2002 | Neumann et al. |

FOREIGN PATENT DOCUMENTS

| | | |
|---|---|---|
| DE | 4028916 C2 | 3/1992 |
| DE | 4206199 C1 | 11/1992 |

(Continued)

OTHER PUBLICATIONS

International Search Report dated Feb. 22, 2022 for International Patent Application No. PCT/EP2021/081805 (3 pages in German with English translation).

(Continued)

*Primary Examiner* — Yun Qian \
(74) *Attorney, Agent, or Firm* — Smith, Grambell & Russell, LLP

(57)      ABSTRACT

The invention relates to a precious metal mesh which is knitted on a flat-bed knitting machine, having at least two float stitches per wale, thus having a significantly higher density for a given latch needle density of the flat-bed knitting machine than the precious metal mesh according to the prior art.

17 Claims, 3 Drawing Sheets

(56)                References Cited

FOREIGN PATENT DOCUMENTS

| | | | |
|---|---|---|---|
| DE | 4423714 | A1 | 1/1996 |
| DE | 10105624 | A1 | 10/2002 |
| EP | 0364153 | B1 | 3/1992 |
| EP | 0606535 | A1 | 7/1994 |
| EP | 1358010 | B2 | 7/2008 |
| WO | 2016/128184 | A1 | 8/2016 |
| WO | WO-2018065271 | A1 * | 4/2018 ............... D04B 1/14 |

OTHER PUBLICATIONS

Written Opinion of the International Searching Authority dated Feb. 22, 2022 for International Patent Application No. PCT/EP2021/081805 (5 pages in German).

Maxwell. G.R. Chapter 9: Nitric Acid. Synthetic Nitrogen Products—A Practical Guide to the Products and Processes. Springer Science + Business Media, Inc. 2005. p. 213-250.

Jess, Andreas et al. Chapter 6.4. Nitric Acid. Chemical Technology; Wiley-VCH Verlag, Weinheim. 2013.pp. 568-583.

Notice of Opposition filed by Johnson Mathey Public Limited Company on Feb. 10, 2025 for European Patent No. 4247554 (European Patent Application No. 21802385.1) 16 pages.

Johnson Matthey diversifies its product range. Nitrogen+Syngas Magazine. May-Jun. 1997. Issue 227. 6 pages.

Ashcroft, Julie, et al. Designing for Demand. Sep. 2020. World Fertilizer Magazine. pp. 65-68.

Fjellvag, A. Slagern, et al. Grain Reconstruction of Palladium and Palladium-Nickel Alloys for Platinum Catchment. Johnson Matthey Technol. Rev. 2019. vol. 63, No. 4, pp. 236-246 + Web Abstract.

Liu, Su, et al. The impact of float stitches on the resistance of conductive knitted structures. Textile Research Journal., 2016. vol. 86, No. 14, pp. 1455-1473.

Reply to Notice of Opposition by Umicore AG & Co KG on Jul. 25, 2025 for European Patent No. 4247554 (European Patent Application No. 21802385.1) (8 pages in German; 8 pages English machine translation).

Altaylouni, Ammar. Analyse des dynamischen Verhaltens der Fadenführung in Strickmaschinen vorgelegt von Dipl.-Ing. Ammar Altaylouni [Analysis of the Dynamic Behavior of Thread Guidance in Knitting Machines] (141 pages in German; 146 pages English machine translation).

Translation of the Written Opinion of the International Searching Authority mailed Feb. 22, 2022 for International Patent App. No. PCT/EP2021/081805 (4 pages).

International Preliminary Report on patentability mailed May 16, 2023 for International Patent App. No. PCT/EP2021/081805 (6 pages in German; 5 pages English translation).

Summons to attend oral proceedings mailed Nov. 12, 2025 for European Patent No. 4247554 (European Patent Application No. 21802385.1) (11 pages in German; 12 pages English translation).

Brief communication—Opposition proceedings mailed Jul. 30, 2025 for European Patent No. 4247554 (European Patent Application No. 21802385.1) (9 pages in German; 9 pages English translation).

Further communication of a notice of opposition and request to file observations mailed Mar. 26, 2025 for European Patent No. 4247554 (European Patent Application No. 21802385.1) (3 pages in German; 3 pages English translation).

* cited by examiner

PRECIOUS METAL MESH FOR CATALYZING GAS-PHASE REACTIONS

The invention relates to knitted precious metal meshes having a novel knitting structure for catalytic oxidation of ammonia, in particular for oxidation to NO, as used for nitric acid production.

Precious-metal-catalyzed gas reactions, such as the oxidation of ammonia with atmospheric oxygen in nitric acid production (Ostwald process) or the reaction of ammonia with methane in the presence of oxygen to give hydrocyanic acid (Andrussow process) have long been considered extremely important from an industrial perspective; after all, they provide base chemicals for the chemical industry and for fertilizer production on a large industrial scale (Andreas Jess, Peter Wasserscheid: Chemical Technology; Wiley-VCH Verlag, Weinheim 2013, Chapter 6.4.)

At the center of these heterogeneously catalyzed gas reactions are precious metal catalysts in the form of gas-permeable spatial structures, on or in which the reaction takes place. Here, precious metal meshes in the form of woven fabrics (DE4028916 C2) or knitted fabrics (EP0364153 B1, DE4206199 C1) made of fine precious metal wires have been established for some time now.

The catalyst grids are typically arranged in a flow reactor in a plane perpendicular to the flow direction of the gas mixture. Conical arrangements are also known. A plurality of precious metal meshes are expediently arranged one behind the other and combined to form a mesh stack.

Figure 1:
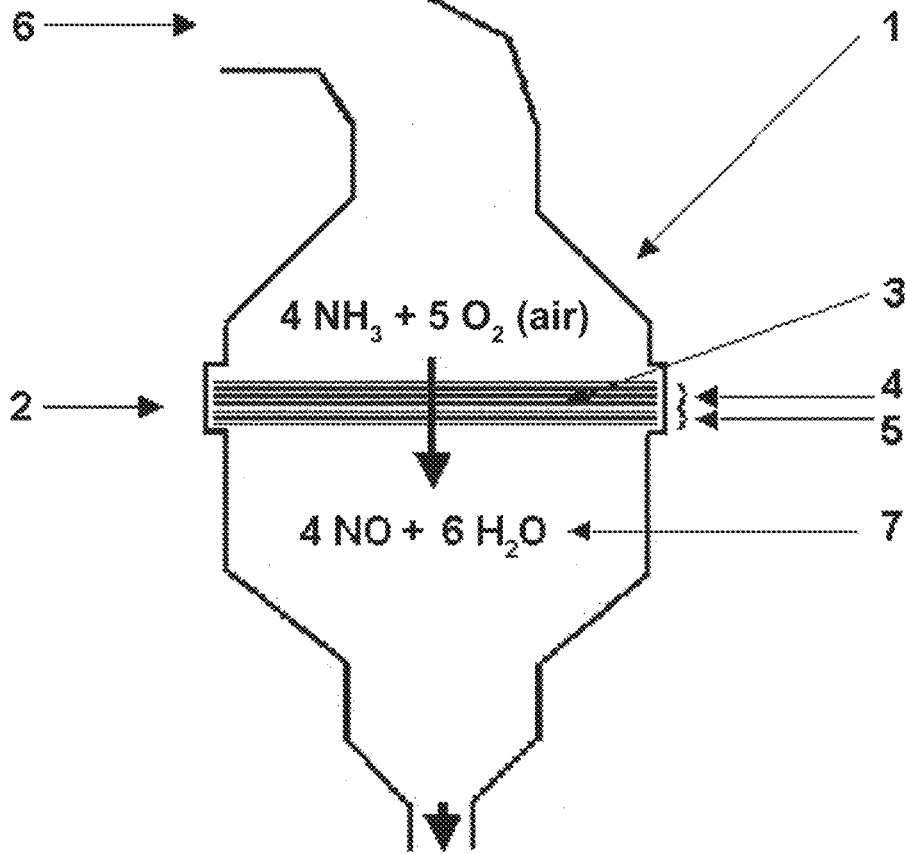
FIG. 1 schematically shows a reactor with mesh stack.

FIG. 1 schematically shows the reactor with the mesh stack installed therein, whose function is described below, in an example of catalytic ammonia oxidation (Ostwald process):

In the reaction zone (2) of the flow reactor (1), the mesh stack (3), which consists of a plurality of catalyst meshes (4) arranged one after the other on the inlet side, and of downstream separating and getter meshes (5), is arranged in a plane perpendicular to the flow direction. This mesh stack is held in its position by clamping.

The reaction gas (ammonia-atmospheric oxygen mixture having an ammonia content of 9-13 vol. %) (6) flows through the mesh stack (3) at atmospheric or increased pressure, wherein ignition of the gas mixture takes place in the inlet region and the combustion reaction giving nitrogen monoxide (NO) and water encompasses the entire reaction zone (2):

$$4NH_3+5O_2(air)\rightarrow4NO+6H_2O$$

Undesirable side reactions are the oxidation of the ammonia to nitrogen ($N_2$) and nitrous oxide ($N_2O$), wherein the former only reduces the yield of NO, but the latter is also a powerful greenhouse gas:

$$4NH_3+3O_2(air)\rightarrow2N_2+6H_2O$$

$$4NH_3+4O_2(air)\rightarrow N_2O+6H_2O$$

The NO in the outflowing reaction gas mixture subsequently reacts with the excess atmospheric oxygen to give $NO_2$:

$$2NO+O_2\rightarrow2NO_2$$

An undesired side reaction here is the formation of nitrous oxide:

$$2NO+\tfrac{1}{2}O_2\rightarrow2N_2O$$

The $NO_2$ in turn reacts in a downstream absorption with water to give nitric acid, which is fed, for example, to fertilizer production:

$$3NO_2+H_2O\rightarrow2HNO_3+NO$$

Precious metal wires made of platinum, rhodium or of alloys of said metals with other precious or non-precious metals are used for the production of the precious metal meshes. Platinum-rhodium or platinum-palladium-rhodium alloys having 88 to 97 wt % platinum are typical here. Platinum is required to achieve the highest possible ammonia conversion, and rhodium improves the selectivity to NO, thereby reducing the emission of nitrous oxide, and increases the mechanical strength [G. R. Maxwell: "Synthetic Nitrogen Products—A Practical Guide to the Products and Processes", Springer Science+Business Media, Inc. 2005, page 220]. In turn, palladium is used, depending on precious metal prices, to reduce the precious metal costs by replacing platinum.

Figure 2:
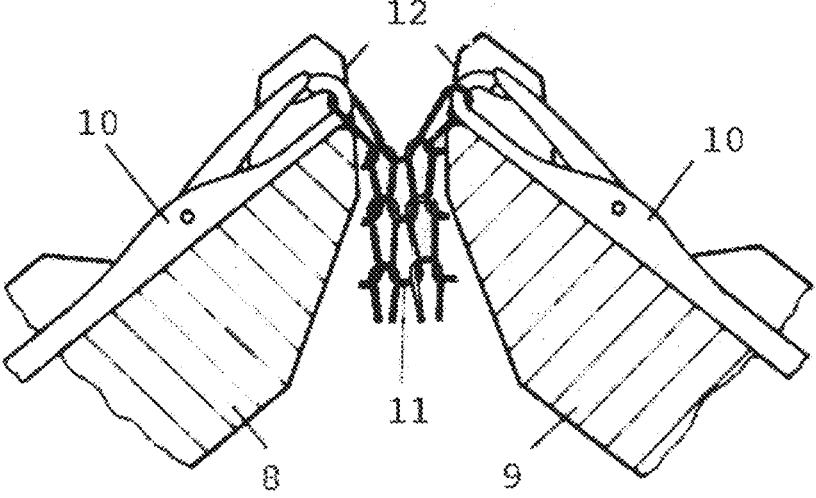
FIG. 2 shows the structure of the flat-bed knitting machine.
Figure 3:
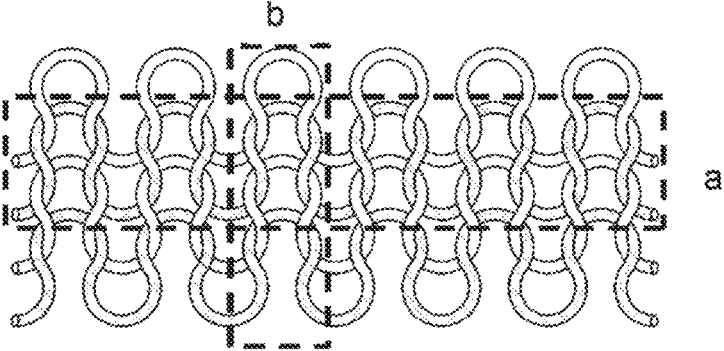
FIG. 3 shows a knitted fabric example.

Flat-bed knitting machines are used for the knitting of precious metal meshes. The structure of the flat-bed knitting machine is illustrated in FIG. 2. The flat-bed knitting machine has a front (8) and a rear needle bed (9) in which the latch needles (10) are installed. The latch needles pass through different positions depending on the programming of the machine. The programming thus specifies the structure of the knitted fabric. An example of a knitted fabric is shown in FIG. 3: the line in which the yarn or wire runs is referred to as a row (a); the stitches interlaced with one another using a latch needle form a wale (b). A special feature of the flat-bed knitting machine with respect to other fabric-forming machines is that knitted fabrics can be formed synchronously and independently of one another on the front and on the rear needle beds (single-bed product). Moreover, spacer fabrics (two-bed fabrics) can be formed, in which the thread alternating in the front and rear forms stitches or double-knit (EP1358010 B2). The knitted fabric is knitted downwardly between the two needle beds (11). This is done by successively casting off the individual formed stitches over the casting-off position and casting-off web edge (12).

Knitted precious-metal meshes have a number of advantages over woven precious-metal meshes, which is why they are preferred today in industrial use. For one thing, knitting technology offers the potential for a high degree of flexibility with respect to knitting patterns, wire thicknesses used, and resulting basis weight. For another thing, precious metal knitted fabrics can be produced more economically since set-up times are shorter in knitting technology than in weaving technology. This requires, in particular, a significantly reduced precious metal bond in production. In addition, precious metal meshes of any length can be produced on flat-bed knitting machines. However, the minimum mesh size, i.e., the density of the knitted fabric, is limited by the maximum number of latch needles per given width.

The essential terms are defined below:

Precious metals are defined as gold, silver and the platinum metals (Ru, Rh, Pd, Os, Ir, Pt).

Catalyst meshes are those meshes whose catalytic activity is used for the reaction of ammonia with oxygen.

Getter meshes are those meshes which are installed in the reaction gas flow on the outlet side relative to the catalyst meshes in order to capture volatile platinum oxide for the purpose of recycling by formation of alloys with the palladium of the getter meshes and thus to minimize the loss of platinum. Precious metal meshes are the entirety of the catalyst and getter meshes. Separation meshes are meshes which are made of steel that is stable at high temperatures, and which are installed between the precious metal meshes in order to prevent them from sintering together.

The mesh stack consists of the catalyst meshes on the inlet side of the mesh stack, and optionally the getter meshes on the outlet side of the mesh stack, as well as the separation meshes, which may be installed between the precious metal meshes.

The flow reactor is the reactor that ensures that the reaction gas is passed over the mesh stack installed in it.

The knitting process is carried out using the latch needles. One latch needle is needed for each wale of a knitted fabric.

Needle bed, single-bed fabric, double-bed fabric, pile thread: The needle bed is the element of the flat-bed knitting machine over which the latch needles are guided. The flat-bed knitting machine usually has a front and a rear needle bed on which one knitted fabric can be knitted in each case (single-bed fabric). If these two knitted fabrics are knitted together using pile threads during the knitting process, the newly created knitted fabric is a two-bed fabric.

A handle is created by joining two loops. A double-knit is a handle that is inserted from one needle bed to the opposite needle bed in an R/R weave. The terms "handle", "loop" and "R/R weave" are known to the person skilled in the art.

Stitch row and wale: The stitches formed one after the other by the same thread are referred to in their entirety as a row of stitches. The parallel rows of stitches are held together by interlacing the stitches of a wale.

Figure 4:
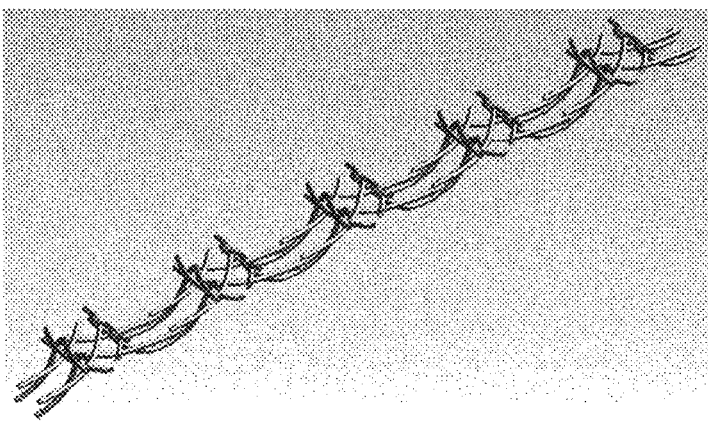
FIG. 4 shows a precious metal mesh knitting with a stitch formed with the same wire at each latch needle position.
Figure 5:
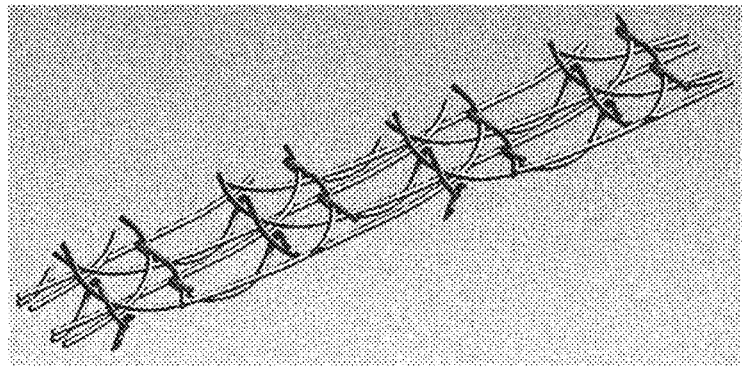
FIG. 5 shows a precious metal mesh knitting with a stitch formation of two wires (wire A and wire B) with one wire representing a float stitch.

Usually, the precious metal meshes are knitted in a stitch-forming structure in which a stitch is formed with the same wire at each latch needle position (FIG. 4) or two wires (wire A and wire B) are knitted together in a row and, in alternating fashion at each latch needle position, one wire forms a stitch and the other wire is left to pass without forming a stitch (FIG. 5). The latter is referred to as a float stitch and is bordered by a stitch on both sides. In this way, two wires are knitted together.

The inventors have surprisingly found that the knitted structure, in particular of the first catalyst mesh, influences the selectivity of the catalyst for the oxidation of ammonia to $N_2O$. The object of the present invention was therefore to find a knitted structure which has a lower selectivity for $N_2O$ formation than precious metal mesh structures according to the prior art.

Figure 6:
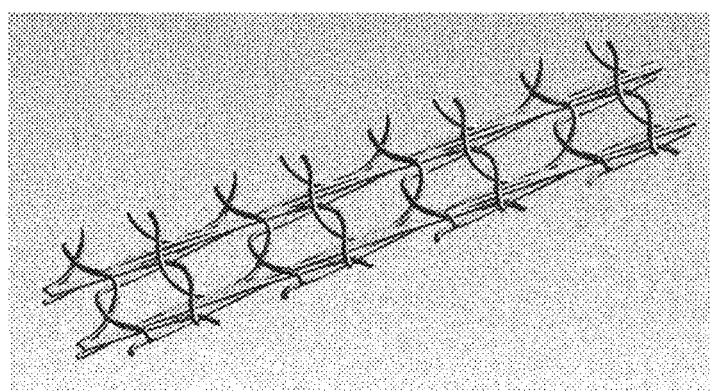
FIG. 6 shows an example of a knitted fabric with three float stitches.

Thus, knitted fabrics were produced in which two or more wires are knitted together and, in alternating fashion, one wire is used per needle position for stitch formation, while the other wires are guided past as float stitches without stitch formation. As a result, despite the float stitch, a stitch is formed at each latch needle position; the density of the knitted fabric is increased even though the number of stitches is the same. For a given number of tongue needles per width, the density of the knitted fabric can thus be further increased. FIG. 6 shows an example with three float stitches, i.e., three wires passing each stitch. The knitted fabric thus consists of four wires knitted together within one row of stitches. These knitted fabrics, which have more than one float stitch while simultaneously forming stitches at each needle position, surprisingly have a lower selectivity for oxidation of ammonia to $N_2O$ (nitrous oxide). This is surprising, as even compared to the prior art with the same wire surface and quantity, this improvement can be observed.

The object is therefore achieved by a knitted precious metal mesh, wherein the precious metal mesh has n wires per row and at least two, at most (n−1) float stitches per wale, wherein: n≥3. This means that at each latch needle position only some of the wires are caught by the latch needle in order to be interlaced with the previous stitch within the same wale. The other wires are passed on, uninterlaced, to the next stitch within the same row. Typically, this is where the interlacing of other wires occurs.

Preferably, the precious metal mesh according to the invention comprises n wires per row and (n−1) float stitches per wale, wherein: n≥3, i.e., only one wire is caught by the latch needle at each latch needle position in order to be interlaced with the previous stitch within the same wale; the other wires are guided past, uninterlaced, to the next stitch in the same row, on which the next wire is selected for interlacing. If a fixed sequence of wires is chosen for the interlacing, the distance from one interlacing to the next interlacing is the same for all wires.

Particularly preferably, n≥4, i.e., the precious metal mesh according to the invention comprises at least four wires in a row.

The number of wires per row can be further increased, but this makes the knitting process more complex, such that a higher number of wires per row is less practicable. For this reason, it is preferred to use 4 wires per row, of which 3 wires are guided past each stitch position uninterlaced, and one wire is interlaced for the purpose of stitch formation.

In order to minimize the complexity of production and thus the costs, the wires included in the precious metal mesh according to the invention are of the same composition and the same diameter.

A variant of the precious metal mesh according to the invention consists of wire made of platinum or a platinum alloy, wherein the latter preferably contains at least 75% platinum. In this case, the precious metal mesh can be used as a catalyst mesh for ammonia oxidation, taking advantage of the better selectivity as described above.

A further variant of the precious metal mesh according to the invention consists of wire made of palladium or a palladium alloy, wherein the latter preferably contains at least 75% palladium. This variant can be used as getter mesh. The increased surface area of the precious metal mesh may improve the platinum recovery rate.

A further precious metal mesh variant according to the invention comprises at least one precious metal wire made of platinum or a platinum alloy, and at least one precious metal wire made of palladium or a palladium alloy. These wires are knitted together as described above; the precious metal mesh is thus a catalyst mesh, which at the same time includes the functionality of a getter mesh. It can be used as the last catalyst mesh as viewed in the gas flow direction The invention further comprises a method for the catalytic oxidation of ammonia, comprising the steps of providing precious metal meshes according to the invention installing a mesh stack (3) containing one or more precious metal meshes (4) according to the invention, in a flow reactor (1), wherein catalyst meshes (4) are arranged on the gas inlet side of the mesh stack and getter meshes (5) are arranged on the gas outlet side of the mesh stack.

supplying a reaction gas (6) containing ammonia and oxygen at a temperature in the flow reactor (1) of between 500° C. and 1300° C. and a pressure of between 0.1 MPa and 1.4 MPa, wherein the ammonia reacts catalytically with the oxygen and NO is obtained, which can be used for nitric acid production.

In a preferred method variant, a platinum-containing precious metal mesh according to the invention is installed on the gas inlet side of the mesh stack as the outermost precious metal mesh.

Further preferred is a method variant in which a precious metal mesh according to the invention, comprising both one or more platinum-containing wires and one or more palladium-containing wires, is installed on the gas outlet side of the mesh stack as the outermost precious metal mesh.

Furthermore, palladium-containing precious metal meshes according to the invention can be arranged downstream of the mesh stack on the gas outlet side and can thus be used as getter mesh in order to recover volatile platinum oxide from the catalyst meshes and to supply it for precious metal recycling.

The effect of the invention shall be demonstrated by the following examples:

EXAMPLE 1

A precious metal mesh is knitted as a single-layer knitted fabric (single-bed fabric) with three float stitches on a flat-bed knitting machine. Wire of the composition PtRh5 with a wire diameter of 85 μm is used.

COMPARATIVE EXAMPLE 1

A precious metal mesh is knitted as two-layer knitted spacer fabric (two-bed fabric) with a single float stitch on a flat-bed knitting machine. Wire of the composition PtRh5 with a wire diameter of 85 μm is used.

COMPARATIVE EXAMPLE 2

A single-layer knitted fabric (single-bed fabric) with a single float stitch is knitted on a flat-bed knitting machine. Wire of the composition PtRh5 with a wire diameter of 100 μm is used.

Testing

The precious metal meshes are measured as follows: The precious metal mesh is installed upstream of a mesh stack A, consisting of 4 single-layer and 1 two-layer (two-bed fabric) catalyst meshes made of PtRh5 in a test reactor such that the two-layer catalyst mesh of the mesh stack A is located between the precious metal mesh to be measured and the single-layer catalyst meshes. The same mesh stack A is used for all three measured precious metal meshes, so that the total quantity of precious metal m used is almost identical in all three cases. It was m=47.2 g for Example 1, m=46.7 g for Comparative Example 1, and m=47.0 g for Comparative Example 3, which means that 47 g±0.6% precious metal was used in all three examples.

A reaction gas mixture with 10.5% by volume ammonia, remainder air, is then passed through the test reactor at a pressure of 500 kPa. Then the temperature upstream of the first catalyst mesh $T_{upstream}$ is set (reaction gas temperature) and the $N_2O$ concentration is measured for each mesh stack. The ammonia was always completely converted; the selectivity to NO was 95 to 96%.

The remaining portion of ammonia is converted to nitrogen ($N_2$) and nitrous oxide ($N_2O$).

Table 1 shows the measured concentration of nitrous oxide for various temperatures upstream of the first catalyst mesh (reaction gas temperature) $T_{upstream}$.

| $T_{upstream}$ [° C.] | Example 1 | Comparative Example 1 | Comparative Example 2 |
|---|---|---|---|
| 160 | 1229 vol. ppm | 1364 vol. ppm | 1302 vol. ppm |
| 175 | 1126 vol. ppm | 1257 vol. ppm | 1239 vol. ppm |
| 192 | 1058 vol. ppm | 1145 vol. ppm | 1165 vol. ppm |

This shows that the precious metal mesh according to the invention (Example 1) leads to lower nitrous oxide emissions than Comparative Examples 1 and 2.

The invention claimed is:

1. A method for the catalytic oxidation of ammonia, comprising the following steps of
   providing one or more precious metal meshes, wherein at least one of the provided one or more precious metal meshes is a knitted precious metal mesh that comprises n wires per row and at least two, at most (n−1) float stitches per wale, wherein: n>3;
   installing a mesh stack containing said knitted precious metal mesh in a flow reactors;
   supplying a gas containing ammonia and oxygen at a temperature in the flow reactor of between 500° C. and 1300° C. and a pressure of between 0.1 MPa and 1.4 MPa.

2. The method according to claim 1, characterized in that said knitted precious metal mesh comprises n wires per row and (n−1) float stitches per wale, wherein: n≥3.

3. The method according to claim 1, characterized in that n≥4.

4. The method according to claim 1, characterized in that all n wires are of the same composition and diameter.

5. The method according to claim 1, characterized in that said knitted precious metal mesh comprises precious metal wires of platinum or a platinum alloy.

6. The method according to claim 5, characterized in that the precious metal wires consist of a platinum alloy with at least 75% platinum.

7. The method according to claim 1, characterized in that said knitted precious metal mesh comprises precious metal wires of palladium or a palladium alloy.

8. The method according to claim 1, characterized in that said knitted precious metal mesh comprises precious metal wires consist of a palladium alloy with at least 75% palladium.

9. The method according to claim 1, characterized in that said knitted precious metal mesh comprises at least one precious metal wire of platinum or a platinum alloy, and at least one precious metal wire of palladium or a palladium alloy.

10. The method according to claim 1, characterized in that one of the one or more precious metal meshes has precious metal wires that consist of platinum or a platinum alloy and is used as the outermost precious metal mesh on the gas inlet side of the mesh stack and is thus the first of the precious metal meshes through which the reaction gas flows.

11. The method according to claim 1, characterized in that one of the one or more precious metal meshes has at least one precious metal wire that consists of platinum or a platinum alloy, and at least one precious metal that consists of palladium or a palladium alloy and is used as the outermost precious metal mesh on the gas outlet side of the catalyst mesh stack and is thus the last of the catalyst meshes through which the reaction gas flows.

12. The method according to claim 1, characterized in that at least one of the one or more precious metal meshes has precious metal wires consisting of palladium or a palladium alloy and is used on the gas outlet side of the precious metal mesh stack as a getter mesh and the reaction gas thus flows through said mesh downstream of the catalyst meshes.

13. The method according to claim 1, wherein installing the mesh stack comprises installing, in addition to said knitted precious metal mesh, one or more catalyst meshes arranged on the gas inlet side of the mesh stack and getter meshes arranged on the gas outlet side of the mesh stack.

14. The method according to claim 1, wherein said knitted precious metal mesh is provided on a gas inlet side of the mesh stack as to be an outermost member of the mesh stack.

15. The method according to claim 1, wherein said knitted precious metal mesh comprises both one or more platinum containing wires and one or more palladium containing wires and is provided on a gas outlet side of the mesh stack as an outermost member of the mesh stack.

16. The method according to claim 1, wherein said providing of one or more precious metal meshes includes providing a plurality of said knitted precious metal meshes, and the method further comprising installing said knitted precious metal meshes in the mesh stack.

17. The method according to claim 1, wherein said knitted precious metal mesh comprises three float stitches.

* * * * *